Dec. 9, 1952 V. M. GRANTHAM 2,621,259

MAGNETIC TRANSDUCER

Filed June 29, 1949

Inventor
VIRGIL M. GRANTHAM

By Morris A. Rakkin

Attorney

Patented Dec. 9, 1952

2,621,259

UNITED STATES PATENT OFFICE 2,621,259

MAGNETIC TRANSDUCER

Virgil M. Grantham, Riverside, N. J., assignor to Radio Corporation of America, a corporation of Delaware Application June 29, 1949, Serial No. 102,023

5 Claims. (Cl. 179—100.2)

This invention relates to magnetic sound-recording and reproducing instruments and has special reference to the provision of an improved transducer or "sound-head" for such instruments.

The transducers used for recording, reproducing and erasing purposes in magnetic phonographs are said to be of the "longitudinal," "perpendicular" or "transverse" type as determined by the particular form or pattern of the magnetic trace which they apply to, or pick up from, the magnetic records which they are designed to serve. When, as is now nearly always the case, "longitudinal" magnetization is employed, the recording and reproducing magnets comprise a circular or rectangular annulus containing at least one slit or flux gap over which the record travels during recording and reproducing intervals.

It has long been known (see Elektrotechnische Zeitschrift, No. 45, November 1935, pages 1219–1221) that:

"The size of the magnetic slit, that is to say, the extent of the recording magnetic field in the feeding direction of the tape must be around ⅕ of the lowest half-wave length. . . . To make a sharply delimited magnetic slit of the said size is the real and basic problem of magnetic sound recording."

In an effort to solve this basic problem it has previously been proposed to make the magnetic core of the transducer of two curved or angular C-shape pieces and to grind and polish the terminals or polar faces of each piece prior to assembling them in the form of a circular (or rectangular) annulus. One trouble with this procedure is that the separate core parts are necessarily subjected, during the polishing operation and in winding the coils thereon, to some form of clamping stress, which when relieved during the assembly operation, gives rise to at least minute irregularities in the alignment of the polar faces of the magnet. The clamping stresses and the resulting degree of misalignment or lack of parallelism of the polar faces of the magnet may be relatively negligible in the case of a magnet having a core made up of large, rugged pieces but is almost inevitably serious when an attempt is made to provide a magnet of the small size required to serve a narrow magnetic sound track, such as the sound track on a modern motion picture film of standard dimensions.

Accordingly, it is an object of the present invention to provide a magnetic transducer which, by reason of its compact construction, the accuracy of the alignment of its parts, and its relative freedom from flux-leakage, shall lend itself readily for use in conjunction with motion picture film of the type provided with a very narrow magnetic sound track.

Another and related object of the invention is to provide a magnetic core and transducer coil assembly the maximum dimension of which, when assembled with its energizing coils in position on the core, shall be no greater than that of the core without the coils, whereby the said assembly shall be especially suited for use in a motion-picture camera, projector and other units wherein space is at a premium.

Another object of the invention is to provide an improved plural-coil electromagnetic transducer wherein the series connection between the coils shall contain no solder or other joint which might give rise to electrical or mechanical trouble.

Still another object of the present invention is to provide a magnetic core and transducer coil assembly constituted of prefabricated parts, and one wherein the magnetic core is of a unique construction such that the transducer coils may be entered onto the core parts, instead of requiring them to be wound in situ thereon.

Another and important object of the present invention is to provide a miniature electromagnetic transducer capable of being assembled, by semi-skilled workers, by mass production methods.

The present invention may be said to be predicated upon an appreciation of the fact that a core structure based upon the geometric principle of a triangle (rather than upon the principle of a circle or a rectangle, as in the prior art) lends itself most readily to the achievement of the foregoing objects. That this is so will be apparent in the light of the following specification and the accompanying single sheet of drawings, wherein Fig. 1 is a view in perspective of the two parts of a bi-part magnetic core employed in the magnetic transducer of the invention;

Figure 3:
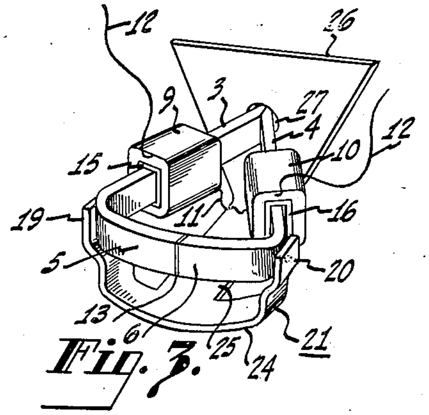
Fig. 3 is a view in perspective of a transducer constructed in accordance with the principle of the invention and showing the parts of Fig. 2 held in their assembled position by a clamp of novel construction.
Figure 4:
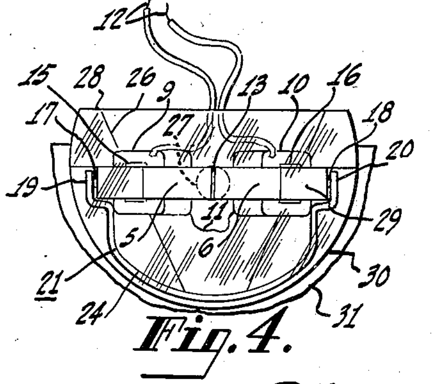
Figure 5:
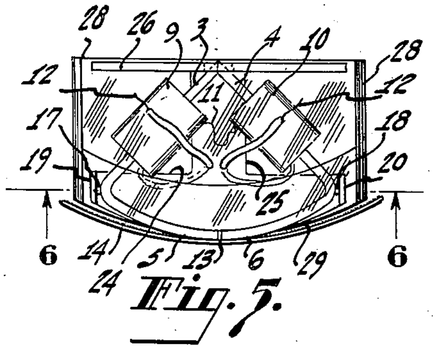

Fig. 4 is a front elevation of the transducer of Fig. 3 in an insulating embedment;

Fig. 5 is a top plan view of the transducer; and

Figure 6:
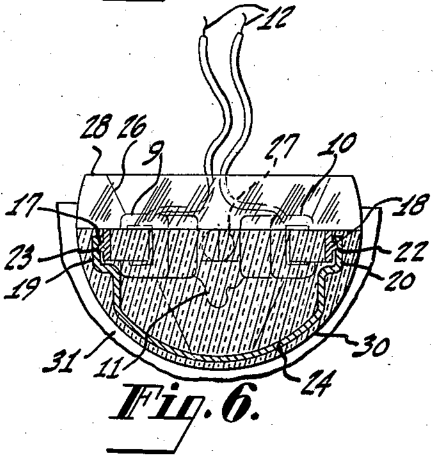

Fig. 6 is a front elevational view, partly in section taken on the line 6—6 of Fig. 5.

As shown in the drawing, wherein like reference characters designate the same parts in all figures, the core of the transducer of the present invention is made up of two separable parts 1 and 2, each comprising a long, straight arm 3, 4, respectively, and a short, preferably curved, arm 5, 6, respectively, disposed at an acute angle $\theta$ (say, 45°) with respect to each other. The polar faces 7, 8 on the short arms 5 and 6 of the parts 1 and 2 are ground, lapped and polished with the required degree of accuracy prior to the installation of an energizing coil 9, 10 on the long, straight arm of each core part. Since the coil receiving arm 3 or 4 of each core part comprises an end portion of that part, both coils 9 and 10 and the series connector 11 therebetween may be prefabricated from a single unbroken strand of wire 12 which, in the absence of any solder joint, is of uniform electrical resistance and mechanical strength per unit length. The coils 9 and 10 are then slipped into position over the free ends of the straight coil-receiving portions 3 and 4 of the core parts without subjecting the core parts 1 and 2 to any stresses or strains such as are present in winding a coil, in situ, upon a core of conventional shape. The core parts 1 and 2, with the coils 9 and 10 in position thereon, are then placed in juxtaposition with their long arms 3 and 4 inclined toward each other and the short arms 5 and 6 disposed in end-to-end relation with their polar faces 7 and 8 presented to each other across an intervening flux gap containing an extremely thin film of copper 13 (Fig. 3) or other non-magnetic material. In the preferred embodiment of the invention which has been selected for illustration the resulting structure is substantially similar in outline to that of an equilateral triangle having a curvilinear base 5—6, the copper filled flux gap 13 over which the motion-picture film or other "tape" record 14 (Fig. 5) passes being at the center of said base and the coils 9 and 10 being disposed on the sides of the triangle. When the assembly comprises either an equilateral or isoceles triangle, the dimensions of the coils and the angles subtended by the base and arms of the triangle may be so chosen that the width of the structure as measured across both coils is no greater than the maximum width of the core structure as measured along the base of the triangle. The fact that the presence of the coils 9 and 10 does not increase the maximum dimension of the structure makes it possible to make a transducer of very small dimensions. Thus, in one practical embodiment of the invention wherein the core parts 1 and 2 were made of solid mu metal 0.08" wide and 0.032" thick, the maximum dimension of the core structure was 0.250" and the width of the copper filled flux gap 13 in the path of the record was approximately 0.00025". In this case the preformed coils 9 and 10 each comprised a hollow insulating coil form 15, 16 of approximately the same internal diameter as the core material and containing approximately 100 turns of No. 40 "Formex" coated copper wire wound end-to-end on the outer surface of the forms.

It will be observed upon close inspection of

Figure 1:
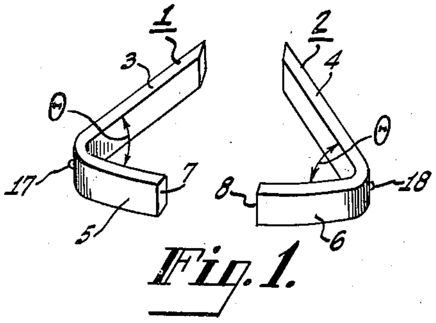
Figure 2:
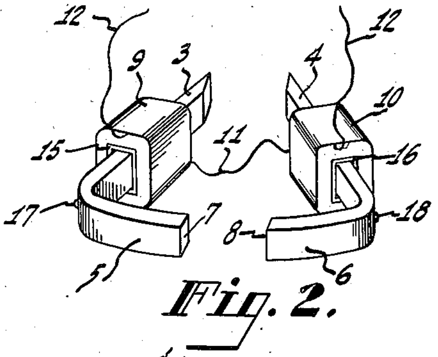
Fig. 2 is a view similar to Fig. 1 but showing two, prefabricated, series-connected transducer coils mounted on the separate core parts subsequent to finishing the polar extremities of the said parts, but prior to assembling the same.

Figs. 1 and 2 that each of the L-shape core parts 1 and 2 is provided on its elbow with a small, preferably rounded, protuberance 17 and 18, respectively. These protuberances facilitate the mounting of the core parts 1 and 2 between the upstanding arms 19 and 20 of a U-shape clamp 21 constituted of brass or other non-magnetic spring material, and which is provided with a pair of oppositely located recesses or dwells 22 and 23 (Fig. 6) for the reception and retention of said protuberances. The base 24 of the U-shape portion of the clamp 21 is provided with a rearwardly extending arm 25 which terminates in an upstanding part 26 containing a dwell or aperture 27 within which the free ends of the straight legs 3 and 4 of the core structure are received and supported. It will be apparent that the use of preformed coils and the provision of a resilient clamp having dwells for seating each end of the triangular core structure permits rapid and accurate assembly of the several parts of the transducer.

In order to prevent an accumulation of dust and magnetic grit in or about the coils and core parts, the entire assembly including the core, its coils and the clamp are contained in an insulating, preferably transparent, embedment 28, with the flux-gap 13 in the convex base 3, 4 of the core structure extending through one surface 29 of the embedment for presentation to the magnetic record 14 (Fig. 5) which it is designed to serve.

It will be observed upon inspection of Figs. 4 and 6 that the outer surface 30 of the embedment or casing 28 which lies beneath the flux-gap 13 is of semi-circular contour and that the said surface 30 is supported on a bearing 31 of similar curvature. Hence the flux gap 13 of the transducer may be properly oriented at a right angle with respect to the line of movement of the record 14 simply by tilting the casing 28 in its bearing 31.

In conclusion, attention is called to the fact that the flux gap 13 is at the center of the widest part (i. e., the base) of the magnetic core. Hence, the several advantages of the transducer of the present invention are achieved without introducing flux leakage paths heretofore present in present day "miniature" transducers.

From the foregoing, it will be apparent that the present invention provides an improved magnetic transducer, and one which, by reason of its compact construction, and the accuracy of the alignment of its parts, lends itself readily for use in conjunction with motion-picture film and other tape-like records provided with magnetic sound tracks capable of accepting a truly "high fidelity" recording.

What is claimed is:

1. In a magnetic transducer, the combination with a bi-part triangular magnetic core structure having a flux gap defined by adjacent ends of its two parts at the center of the base of said triangle and having the other ends of said parts disposed in contiguous relationship at the apex of said triangle, of spring means constituted of non-magnetic material mounted to exert a clamping force upon said parts of said bi-part core structure adjacent to each of the three points of said triangle.

2. In a magnetic transducer, the combination with a bi-part triangular magnetic core structure having a flux gap at the center of the base of said triangle defined by adjacent ends of its two parts and having the other ends of said parts disposed in contiguous relationship at the apex of said triangle, of a spring means constituted of non-magnetic material mounted to exert a clamping force upon said parts of said bi-part core structure adjacent to each of the three points of said triangle, said triangular core structure being provided with a protuberance at each of the ends of the base of said triangle, and said spring clamp being provided with a pair of correspondingly located dwells within which said protuberances are received.

3. The invention as set forth in claim 2 and wherein said spring clamp is provided with a third dwell positioned to receive the ends of the parts comprising the apex of said triangle.

4. A magnetic transducer comprising a bi-part, triangular, magnetic core structure having a flux gap defined by adjacent ends of its two parts at the center of the base of said triangle, a transducer coil on each of the other two sides of said triangle, non-magnetic clamp means mounted to exert a clamping force upon said parts of said bi-part core structure at each of the three points of said triangle, and an insulating casing within which said core structure, coil and clamp are embedded with that portion of the base of said triangular core portion which lies adjacent to said flux gap presented to the exterior of said casing.

5. A magnetic transducer comprising a bi-part, triangular, magnetic core structure having a flux gap at the center of the base of said triangle defined by adjacent ends of its two parts, a transducer coil on each of the other two sides of said triangle, non-magnetic clamp means mounted to exert a clamping force upon said parts of said bi-part core structure at each of the three apices of said triangle, an insulating casing within which said core structure, coil and clamp are embedded with that portion of the base of said triangular structure which lies adjacent to said flux gap presented to the exterior of said casing, the surface of said casing beneath the exposed portion of said core structure comprising a curved surface, and a support means of the same curvature as said curved surface providing a bearing for said casing, whereby said flux gap may be oriented at right angles with respect to the line of movement of a sound track moving across said flux gap.

VIRGIL M. GRANTHAM.

REFERENCES CITED

The following references are of record in the file of this patent:

UNITED STATES PATENTS

| Number | Name | Date |
|---|---|---|
| 2,233,621 | Lovell | Mar. 4, 1941 |
| 2,523,576 | Kornei | Sept. 26, 1950 |

FOREIGN PATENTS

| Number | Country | Date |
|---|---|---|
| 261,136 | Great Britain | Nov. 18, 1926 |
| 322,033 | Great Britain | Nov. 28, 1929 |
| 725,830 | Germany | Sept. 30, 1942 |